United States Patent [19]

McFiggans

[11] 4,253,158

[45] Feb. 24, 1981

[54] SYSTEM FOR SECURING POSTAGE PRINTING TRANSACTIONS

[75] Inventor: Robert B. McFiggans, Stamford, Conn.

[73] Assignee: Pitney Bowes Inc., Stamford, Conn.

[21] Appl. No.: 24,813

[22] Filed: Mar. 28, 1979

[51] Int. Cl.[3] .......................... G06F 1/00; H04Q 3/00; H04L 9/00

[52] U.S. Cl. ................................ 364/900; 340/149 R; 375/2

[58] Field of Search ... 364/200 MS File, 900 MS File; 340/149 R, 149 A, 147 A

[56] References Cited

U.S. PATENT DOCUMENTS

| | | | |
|---|---|---|---|
| 3,654,604 | 4/1972 | Crafton | 340/149 R X |
| 3,792,446 | 2/1974 | McFiggans et al. | 364/900 |
| 3,798,605 | 3/1974 | Feistel | 364/200 |
| 3,956,615 | 5/1976 | Anderson et al. | 340/149 A X |
| 3,962,539 | 6/1976 | Ehrsam et al. | 364/200 X |
| 3,978,457 | 8/1976 | Check et al. | 364/200 |
| 4,097,923 | 6/1978 | Eckert, Jr. et al. | 364/900 |
| 4,122,532 | 10/1978 | Dlugos et al. | 364/900 |

*Primary Examiner*—Raulfe B. Zache
*Attorney, Agent, or Firm*—David E. Pitchenik; William D. Soltow, Jr.; Albert W. Scribner

[57] ABSTRACT

A postage meter includes printing and accounting stations interconnected through an insecure communications link. Each time the meter is tripped, a number generator at the printing station is activated to generate a number signal which is encrypted to provide an unpredictable result. The number signal is also transmitted to the accounting station. At the accounting station the postage to be printed is accounted for and the number signal is encrypted to provide a reply signal. The reply signal is transmitted to the printing station where a comparator compares it with the encryption result generated at the printing station. An equality of the encryption result and the reply signal indicates that the postage to be printed has been accounted for and the printer is activated.

15 Claims, 4 Drawing Figures

SYSTEM FOR SECURING POSTAGE PRINTING TRANSACTIONS

BACKGROUND OF THE INVENTION

1. Field of the Invention

This invention relates generally to postage meters and more particularly to providing a secure meter system wherein printing and accounting stations are interconnected through an insecure link.

2. Brief Description of the Prior Art

Security factors have been of paramount significance in the design and construction of postage metering systems. Postal authorities have required adequate security devices to insure that postage printed is accounted for. With prior mechanical and electromechanical postage metering devices, security has been achieved through the employment of a single secure housing containing both the printing device and accounting registers. The housing generally included means for the ready detection of any unauthorized attempts to alter the accounting registers and/or attempts at the printing of postage without the recording of same in the accounting registers.

In U.S. Pat. No. 3,978,457 issued Aug. 31, 1976 and assigned to the assignee of the present invention, a microcomputerized electronic postage meter system was disclosed. Implementation of this system will greatly enhance postage accounting capabilities and facilitate new meter designs, as well as fully automated mail handling systems, wherein articles to be mailed can be sealed, weighed and the postage automatically applied thereto.

In order to preserve a high level of system integrity, security requirements dictated constraints upon system design. For example, in large console mailing systems optimum design considerations might suggest the placement of postage accounting processing means remote from the postage printing means. The servicing of such systems was difficult and cumbersome because security seals inhibited the servicing of components which were otherwise accessible.

Furthermore, security considerations placed constraints upon utilizing removable accounting processors which could be carried to the postal authorities for resetting. Naturally, large automated mailing consoles could not be physically removed and brought to a post office for resetting the accounting means.

Among the security problems inherent with the employment of separable printing and accounting stations was the possibility that one could gain access to an insecure communications link between separable elements and generate signals which would permit the printing of postage without the accounting for same at the accounting station.

SUMMARY OF THE INVENTION

The present invention relates to a postage meter having printing and accounting stations with an insecure communications link interconnecting the stations. In order to print desired postage, the printing station is activated and a number signal is generated. This number signal is encrypted at the printing station through the use of a secure key. The generated number signal is additionally transmitted to the accounting station wherein it is encrypted using a congruent key to provide a reply signal. The reply signal at the accounting station is transmitted to the printing station, and a comparison is made between the received reply signal and the encryption result generated at the printing station; upon detection of a match, the printer is activated.

The number generator at the printing station may comprise a random number generator such as a free running counter read at random or a consecutive operation counter or any other device capable of generating a nonrecurring or unpredictable number. Interception of the insecure transmission link and recording of the transmitted random number and/or encryption result will not provide information sufficient to anticipate a subsequent encryption result transmitted from the accounting station.

From the foregoing compendium, it will be appreciated that it is an object of the present invention to provide a system for securing postage printing transactions of the general character described which is not subject to the disadvantages aforementioned.

It is a further object of the present invention to provide a system for securing postage printing transactions of the general character described which permits enhanced flexibility in mailing system design by eliminating the requirement for a physically secure link between a printing station and an accounting station.

Another object of the present invention is to provide a system for securing postage printing transactions of the general character described which facilitates the implementation of removable accounting means.

A further object of the present invention is to provide a system for securing postage printing transactions of the general character described which facilitates ready access to serviceable postage mailing system components without the necessity of disturbing securing devices.

Another object of the present invention is to provide a system for securing postage printing transactions of the general character described which prevents unauthorized actuation of a postage printing mechanism.

Other objects of the invention in part will be obvious and in part will be pointed out hereinafter.

With these ends in view, the invention finds embodiment in certain combinations of elements, arrangements of parts and series of steps by which the objects aforementioned and certain other objects are hereinafter attained, all as fully described with reference to the accompanying drawings and the scope of which is more particularly pointed out and indicated in the appended claims.

BRIEF DESCRIPTION OF THE DRAWINGS

In the accompanying drawings in which are shown some of the various exemplary embodiments of the invention.

DESCRIPTION OF THE PREFERRED EMBODIMENT

Figure 1:
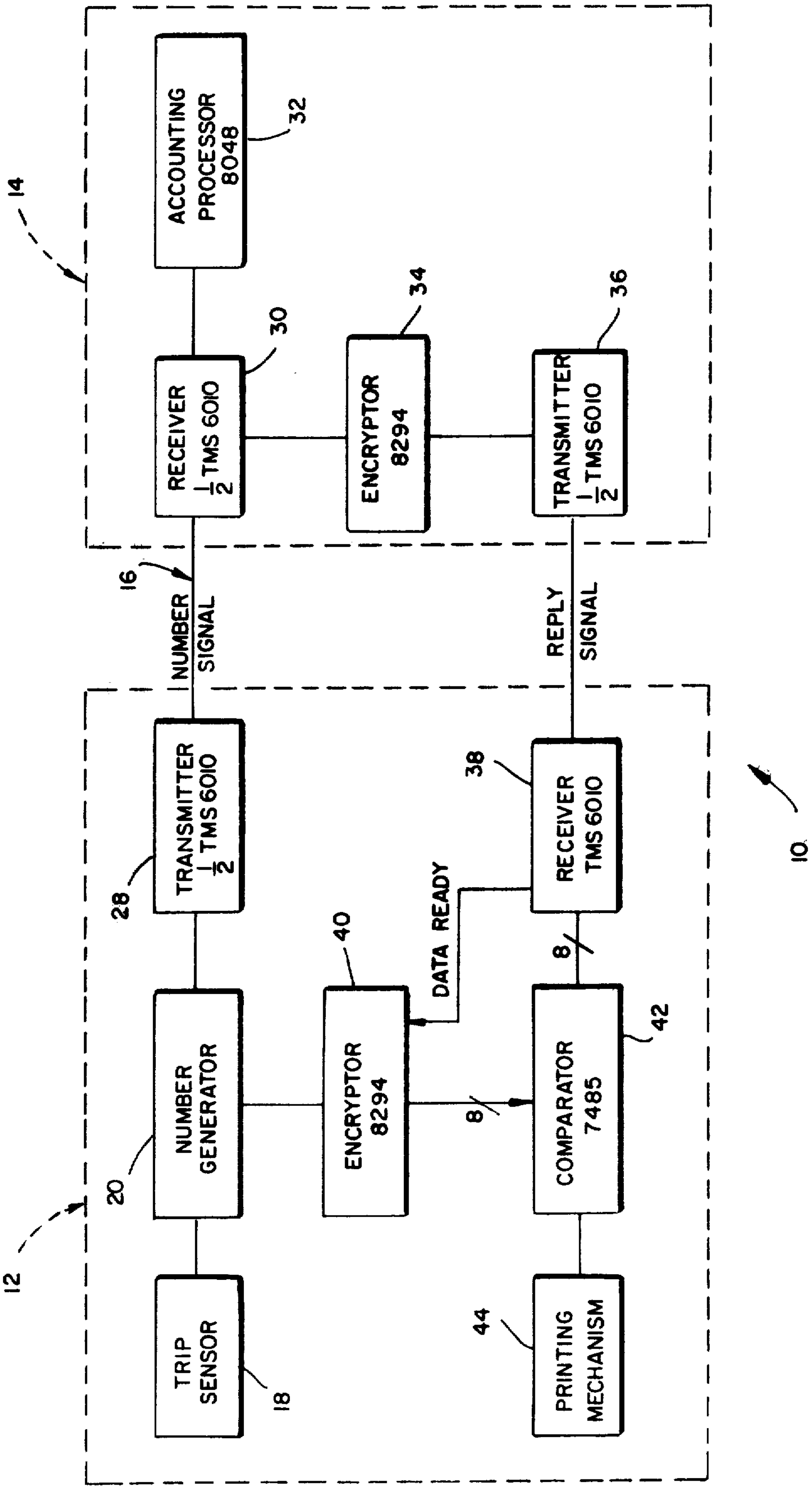
FIG. 1 is a schematized block diagram of an exemplary postage meter constructed in accordance with and embodying the invention and illustrating separate printing and accounting stations interconnected by an insecure communications link.

Referring now in detail to the drawings, the reference numeral 10 denotes generally a postage metering device constructed in accordance will and embodying the present invention. The postage metering device 10 may comprise an electronic postage meter system such as that disclosed in U.S. Pat. No. 3,978,457 or a mechanical or electromechanical postage meter printing mechanism such as that employed in conventional postage meters used in conjunction with a microprocessor accounting system.

The postage metering device 10 includes a printing station 12 and an accounting station 14. In accordance with the invention an insecure communications link 16 interconnects the printing station 12 and the accounting station 14. The communications link 16 may comprise cables interconnecting the printing and accounting stations within a mailing system console or a plug and socket connector whereby a removable accounting station 14 is connected to the printing station 12. Optionally, the communications link 16 may comprise telephone lines whereby a remotely located accounting station 14 controls the operation of the printing station 12 and permits the dispensing of postage only after an appropriate accounting for such postage has been entered in a memory.

The printing station 12 includes a printer trip sensor 18 which may comprise, for example, the trip sensor similar to that employed in typical postage/mailing machines. Upon actuation of the trip sensor 18, a signal is provided at a number generator 20. The number generator 20 generates a digital NUMBER SIGNAL signal comprising a plurality of bits, which NUMBER SIGNAL is subject to encryption at the printing station 12 using a secure encryption key.

In addition, the NUMBER SIGNAL is transmitted at a transmitter 28 to the accounting station 14 through the insecure link 16. The transmitter 28 may comprise a universal asynchronous receiver and transmitter such as the American Microsystems S 1757 or a Texas Instruments TMS 6010 data interface. If the communications link 16 comprises telephone lines, appropriate tone encoding and decoding modems may be employed.

The NUMBER SIGNAL is received at a receiver 30 of the accounting station. The receiver 30 may comprise a compatible universal asynchronous receiver and transmitter. Upon receipt of the NUMBER SIGNAL, an accounting processor 32, e.g. an Intel 8048 microprocessor, makes appropriate entries in its memory to charge the user's account for the postage to be dispensed.

In addition, the NUMBER SIGNAL is transmitted to an encryptor 34 at the accounting station. The encryptor may comprise any of the readily available encryption devices which may, for example, encrypt in accordance with the NBS Data Encryption Standard pursuant to a preset secure key. An example of a typical encryption device suitable for such purpose is the Intel 8294 encryptor. The encryptor 34 provides an encryption result which comprises a REPLY SIGNAL for the printing station 12. The REPLY SIGNAL is transmitted at a transmitter 36 comprising a universal asynchronous receiver and transmitter similar to the receivers and transmitters previously described.

At the printing station 12, the REPLY SIGNAL is accepted at a receiver 38 comprising a further asynchronous receiver and transmitter. It should be appreciated that if, for example, a Texas Instruments TMS 6010 duplex data interface is employed, the transmitter 28 and receiver 38 may comprise segments of a single chip. Similarly, the receiver 30 and transmitter 36 of the accounting station may comprise segments of a single chip.

The receiver 38 groups the first eight bits of the REPLY SIGNAL and transmits a DATA READY signal to an encryptor 40 at the printing station.

The encryptor 40 has received the NUMBER SIGNAL from the number generator 20 and has encrypted such a signal using the same secure key as used at the accounting station encryptor 34.

The DATA READY signal appearing at the encryptor 40 will cause the first eight bits of the encrypted signal to be transmitted from the encryptor 40 to a comparator 42. The comparator 42 may comprise conventional comparators such as a Texas Instruments 7485 or a Signetics 9324, for example, which chips may be stacked as necessary.

At the comparator 42 the REPLY SIGNAL is compared with the signal generated at the encryptor 40; and if a match is indicated, subsequent bits of the REPLY SIGNAL are compared until the entire REPLY SIGNAL has been matched, after which a postage printing mechanism 44 is actuated.

Upon detection of a mismatch at the comparator 42, the printer is locked. It should be appreciated that for security purposes the REPLY SIGNAL and the encryption result at the comparator 40 should comprise greater than eight bits. In lieu of sequentially loading the comparator eight bits at a time, the comparator may comprise a plurality of stacked comparator chips and, if necessary, suitable storage registers for parallel loading and comparison of up to, for example, sixty-four bit signals.

Figure 2:
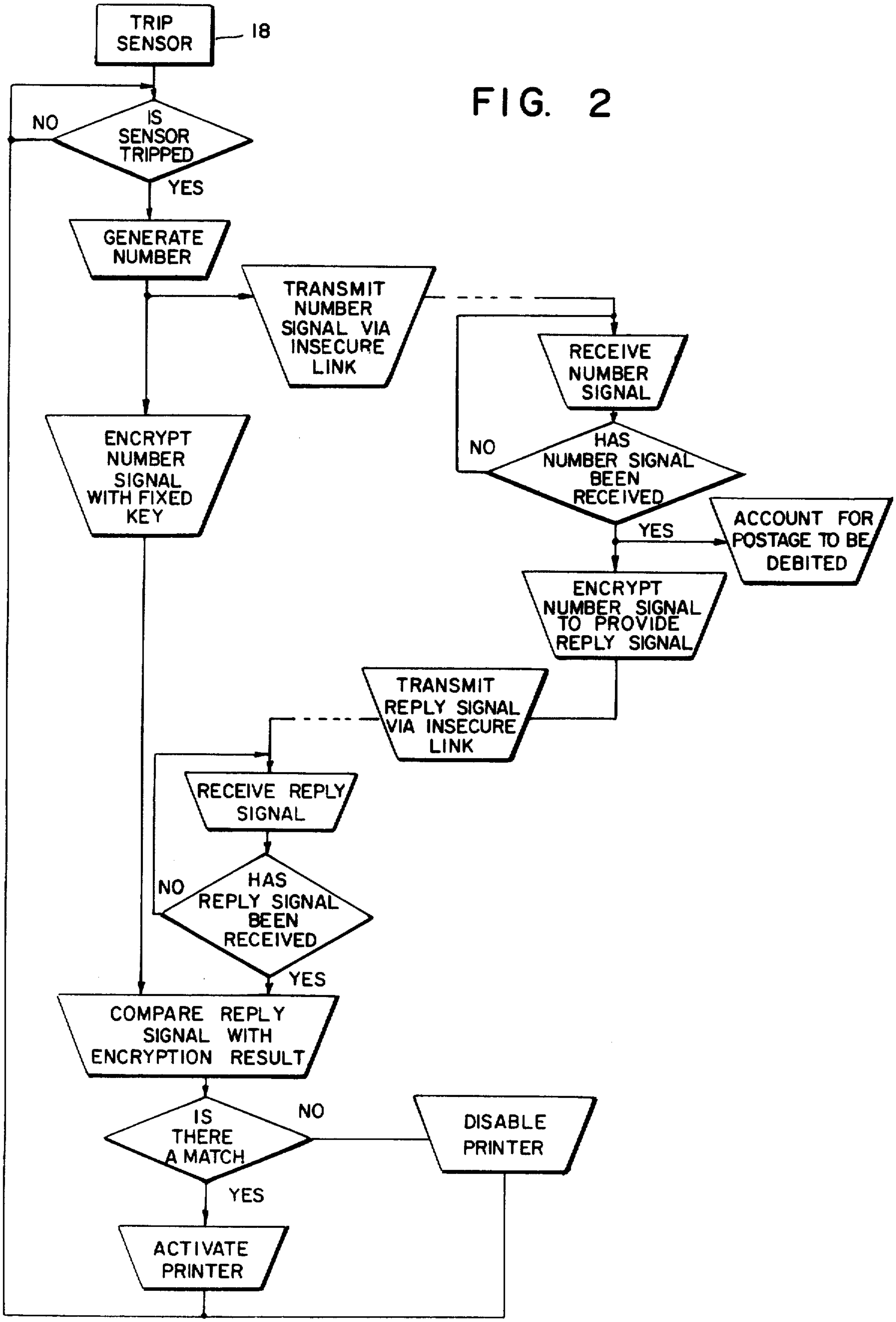
FIG. 2 is a typical flow diagram illustrating a routine for establishing a postage printing transaction at a printing station only upon an appropriate accounting for such transaction at the accounting station.

With reference now to FIG. 2 wherein various steps of the accounting verification routine are depicted, the number generator 20 generates a digital NUMBER SIGNAL at the printing station 12, and this signal is transmitted over insecure transmission means to the accounting station 14 which may comprise a processor. At the accounting station, the NUMBER SIGNAL is received and an accounting entry is performed with respect to the value to be dispensed at the printing station 12. In addition, the NUMBER SIGNAL received is used for the generation of the REPLY SIGNAL at an encryptor utilizing a secure encryption key. The REPLY SIGNAL is then transmitted over the insecure link 16 to the point of origin.

This REPLY SIGNAL is compared with an encrypted signal generated at the printing station utilizing the identical NUMBER SIGNAL and the same encryption key. Upon recognition of an equality between the encryption result generated at the printing station and the REPLY SIGNAL received at the printing station, a value dispensing operation, i.e. the printing of postage, is performed.

In order to preserve security it is essential that the REPLY SIGNAL which authorizes the dispensing of value at the printing station be unpredictable. Assuming that both the printing station 12 and the accounting station 14 are secure, e.g. contained within tamperproof housings, the encryption keys will not be ascertainable; therefore, in order to assure unpredictability of REPLY SIGNALS, it is necessary that the REPLY SIGNAL does not repeat itself with any degree of predictability.

Figure 3:
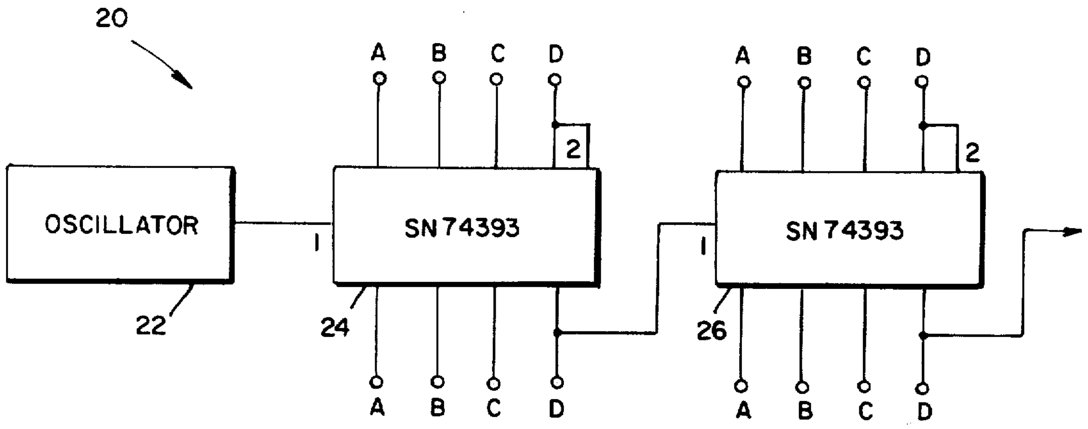
FIG. 3 is a schematized diagram illustrating a typical random number generator which may be employed for providing a number signal at the printing station.

Because the same NUMBER SIGNAL will provide an identical REPLY SIGNAL from the accounting means, the number generator 20 is required to generate sequential number signals which are either unique or unpredictable. An example of a suitable number generator 20 for the generation of unpredictable number signals is illustrated in FIG. 3 wherein a typical free-running counter is shown.

The generator 20 comprises an oscillator 22, the output of which is fed to a dual four bit asynchronous binary counter 24. In order to obtain a number signal of sufficient length, additional counters such as a counter 26 may be placed in series. As shown in FIG. 3, the two counters 24, 26 provide sixteen bits which will generate 65,536 different numbers; and if the oscillator 22 oscillates at 25 MHz, a given number will repeat every 2.62 milliseconds. It should be appreciated that obtaining a reading from the counter output upon every actuation of the trip sensor 18 will result in the production of a random number.

In the alternative, various other devices such as a pseudorandom number generator may be used to generate the NUMBER SIGNAL. A further mode of number generation is a consecutive number counter which totals the number of times the trip sensor 18 has been actuated or a register at the printing station which totals the monetary amounts printed. The readings from such registers, although predictable, will not be duplicated and will generate different REPLY SIGNALS which, absent knowledge of the encryption key, will be unpredictable. Accordingly, any system for the sequential generation of NUMBER SIGNALS which result in an unpredictable encryption result may also be used.

It should be appreciated that the system for securing postage printing transactions heretofore described has been shown in an exemplary manner illustrating a simple postage printing transaction wherein the printing station dispenses the same monetary value of postage after each trip. In the event variable amounts of postage are to be printed, i.e. a multidenomination printer is to be employed, the amount of postage set at the printing unit upon each trip may be encoded as a digital signal and sent as part of the NUMBER SIGNAL to the accounting station 14. In order to authorize the printing of postage, both the generated number and the postage value portions of the NUMBER SIGNAL may be encrypted to provide a single REPLY SIGNAL.

At the printing station both the generated number and the postage value signal are encrypted at the encryptor 40 to provide an encryption result which is transmitted to the comparator 42 to be verified against the REPLY SIGNAL.

Verification of an equality between the encryption result and the REPLY SIGNAL ensures that the monetary value to be printed has been accounted for, and upon such verification the printing mechanism 44 is actuated.

Figure 4:
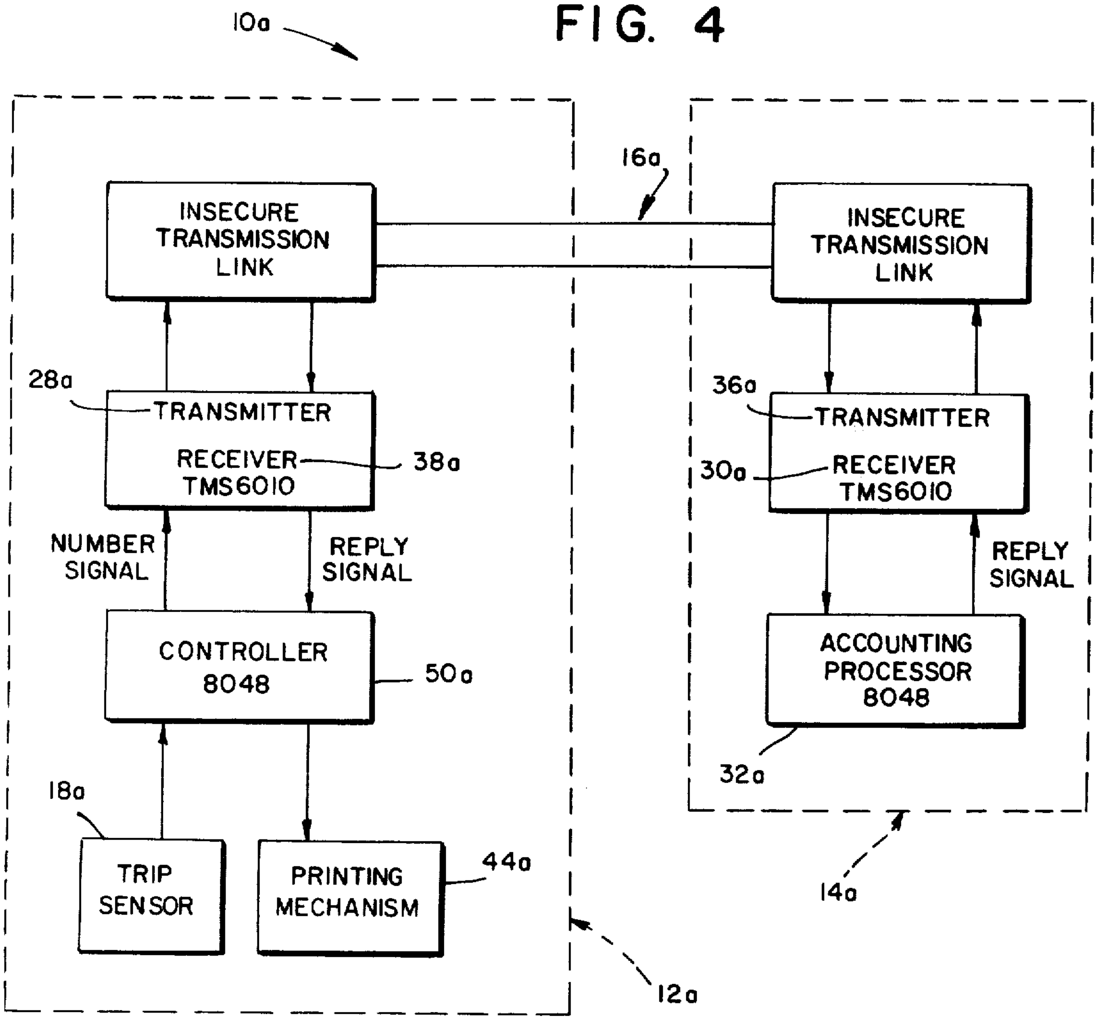
FIG. 4 is a schematized block diagram of an alternate embodiment of the invention wherein a microprocessor controller is utilized for number generation, encryption and comparison at the printing station and the accounting processor is utilized for generating the encryption result at the accounting station.

In FIG. 4 an alternate embodiment of the invention is illustrated wherein like numerals denote like components of the embodiment heretofore described, however bearing the suffix "a". In this embodiment microprocessors are programmed for the implementation of various routines in lieu of the logic components heretofore described.

A postage metering device **10*a* includes a printing station 12*a* and an accounting station 14*a* interconnected by an insecure communications link 16*a*. Upon actuation of a trip sensor 18*a*, a signal is transmitted to a controller 50*a* which may comprise a microprocessor similar to the accounting processor 32 heretofore described and which is suitably programmed for the generation of a NUMBER SIGNAL. The NUMBER SIGNAL fulfills the criterion heretofore discussed such that upon encryption with a fixed encryption, an unpredictable encryption result will be provided. At the printing station 12*a* a transmitter 28*a* transmits the number signal to the accounting station 14*a* through the insecure communications link 16*a***.

At the accounting station a receiver **30*a* is provided to group the bits of the NUMBER SIGNAL in parallel format and transmit the NUMBER SIGNAL to an accounting processor 32*a* similar to the processor 32 heretofore describe however such processor is programmed to encrypt the NUMBER SIGNAL and generate a REPLY SIGNAL in addition to recording the postage printing transaction. The REPLY SIGNAL is transmitted from the accounting processor 32*a* through a transmitter 36*a* similar to the transmitter 36 heretofore described and the communications link 16*a* to the printing station 12*a***.

At the printing station **12*a* a receiver 38*a* receives the REPLY SIGNAL and forwards same in parallel format to the controller 50*a* whereupon the controller compares the REPLAY SIGNAL to the encryption result which was generated from the NUMBER SIGNAL. Upon verification of an equality between the two signals, the controller 50*a* actuates a printing mechanism 44*a*** to complete the transaction and dispense postage.

Various modiciations of the present invention will be readily apparent to those skilled in the art. For example, alternate means may be provided for generating the NUMBER SIGNAL which will provide, upon encryption, an unpredictable encyrption signal.

Further, number signal generation and transmission may be eliminated with the placement of congruent pseudorandum number generators at both the printing station and the accounting station. In such instance the accounting station will transmit its pseudorandum number to the printing station where the comparison is made. The employment of pseudorandum number generators will require, however, nonvolatile memories at both number generators in order to retain the seed numbers requisite for the sequential generation of numbers.

With regard to the communication link, the NUMBER SIGNAL and REPLY SIGNAL may be parallel loaded directly across the link rather than serially transmitted whereupon the employment of transmitter-receiver UARTs will be unnecessary.

Further, the initial printing of postage may take place immediately and the printer enable for subsequent printing only after verification of the REPLY SIGNAL which is received at the printing station after accounting has taken place.

Thus, it will be seen that there is provided a system for securing postage printing transactions which achieves the various objects of the present invention and which is well suited to meet the conditions of practical use.

As various changes might be made in the system as above set forth, it is to be understood that all matter herein described or shown in the accompanying drawings is to be interpreted as illustrative and not in a limiting sense.

Having thus described the invention there is claimed as new and desired to be secured by Letters Patent:

1. A system for securing postage printing transactions between a postage printing station having means for dispensing postage and an accounting station having processing means for registering the value of postage dispensed, the printing station and the processing means of the accounting station being interconnected for data transmission through an insecure communications link, the system comprising means at the printing station for sequentially generating a number signal upon each printing transaction, the communications link transmitting the number signal from the printing station to the accounting station, encryption means at each station, each encryption means receiving the number signal and in response thereto providing an encrypted signal, the means sequentially generating the number signal including means providing unpredictability in each of the encrypted generated number signals, the printing station including comparison means, the communications link transmitting the accounting one of the encrypted signals to the comparison means, the comparison means comparing the one encrypted signal with the other encrypted signal at the printing station and in response to the equality thereof enabling the postage dispensing means, whereby postage is imprinted only after the authenticity of an unpredictable encrypted signal have been verified at the printing station.

2. A system for securing postage printing transactions constructed in accordance with claim 1 wherein the means for sequentially generating a number signal upon each printing transaction comprises a random number generator.

3. A system for securing postage printing transactions constructed in accordance with claim 1 wherein the means for sequentially generating a number signal upon each printing transaction comprises an ascending register.

4. A system for securing postage printing transactions constructed in accordance with claim 1 wherein the number signal is transmitted serially from the printing station to the accounting station, the system further including an interface interconnecting the means sequentially generating a number signal with the communications link and a further interface interconnecting the communications link with the accounting station encryption means.

5. A system for securing postage printing transactions constructed in accordance with claim 4 further including interface means coupled to the accounting station encryption means serially transmitting the one encrypted signal, the printing station including an interface, the printing station interface receiving the serially transmitted one encrypted signal and in response thereto grouping the one signal and providing a signal indicative of the completion of said grouping, the encryption means at the printing station receiving the completion signal and in response thereto providing a correlated grouping of encrypted signals, the comparator receiving the correlated grouping of encrypted signals and the grouping of the one signal and in response to the equality thereof enabling the postage dispensing means.

6. A system for securing postage printing transactions constructed in accordance with claim 1 wherein the postage printing station further includes trip sensor means coupled to the number generator means such that the number generating means generates a postage value signal upon each printing transaction, the number signal including the postage value signal.

7. A system for securing postage printing transactions constructed in accordance with claim 1 wherein the accounting station is separable from the printing station and includes a connector device such that the accounting station may be removed for resetting the processing means.

8. A method of securing postage printing transactions between a postage printing station having means for dispensing postage and an accounting station having processing means for registering the value of postage printed wherein the postage printing station and the accounting station are interconnected through an insecure communications link, said method comprising the steps of (a) sequentially generating an unpredictable signal at the printing station upon each printing transaction, (b) sequentially generating a corresponding unpredictable signal at the accounting station upon each printing transaction, (c) transmitting the corresponding unpredictable signal from the accounting station to the printing station, (d) comparing the unpredictable signal generated at the printing station with the corresponding unpredictable signal transmitted to the printing station, and (e) authorizing the printing of postage in response to the detection of a coincidence between the two unpredictable signals.

9. A method of securing postage printing transactions in accordance with claim 8 wherein the unpredictable signal is generated at each station by encrypting a sequentially generated number signal.

10. A method of securing postage printing transactions constructed in accordance with claim 9 wherein the number signal is sequentially generated at the printing station and transmitted to the accounting station.

11. A method of securing postage printing transactions in accordance with claim 10 wherein each sequential number signal is nonrecurring.

12. A method of securing postage printing transactions constructed in accordance with claim 10 wherein the number signal is generated randomly.

13. A method of securing postage printing transactions constructed in accordance with claim 10 wherein the number signal is generated pseudorandomly.

14. A method of securing postage meter transactions between a postage printing station having means for dispensing postage and a remote accounting station having processing means for accounting for postage meter transactions wherein the postage printing station and the accounting station are interconnected through an insecure communications link, the method comprising the steps of:

(a) generating an unpredictable number signal at the postage meter upon actuation to effect a postage meter transaction, (b) transmitting the unpredictable number signal to the remote accounting station over the insecure communications link, (c) generating an encrypted signal at the accounting station upon receiving the unpredictable number signal, (d) transmitting the encrypted signal from the accounting station to the printing station, (e) generating an encrypted signal at the printing station upon actuation to effect the postage meter transaction, (f) comparing the encrypted signal generated at the printing station with the corresponding encrypted signal transmitted over the insecure communications link from the accounting station to the printing station, and (g) enabling a postage meter function in response to the detection of a coincidence between the two encrypted unpredictable signals.

15. A system for securing postage printing transactions between a postage printing station having means for dispensing postage and an accounting station having processing means for accounting for postage meter transactions, the printing station and the accounting station being interconnected for data transmission through an insecure communications link, the system comprising: means at the printing station for generating an unpredictable number signal upon actuation to effect a postage meter transaction, means for transmitting the unpredictable number signal over the insecure communications link from the printing station to the accounting station, encryption means at each station, each encryption means receiving the number signal and in response thereto providing an encrypted signal, the printing station including comparison means for comparing encrypted signals, means at the accounting station for transmitting the encrypted signal at the accounting station over the insecure communications link to the comparison means at the printing station, the comparison means comparing the transmitted encrypted signal with the encrypted signal at the printing station and in response to the equality thereof enabling the postage meter transaction, whereby the postage meter transaction is enabled only after the authenticity of an encrypted signal transmitted from the accounting station has been verified at the printing station.

* * * * *

UNITED STATES PATENT AND TRADEMARK OFFICE

CERTIFICATE OF CORRECTION

PATENT NO. : 4,253,158

DATED : Feb. 24, 1981

INVENTOR(S) : Robert B. McFiggans

It is certified that error appears in the above-identified patent and that said Letters Patent are hereby corrected as shown below:

Column 3, line 10, change "will" to --with--.

Column 6, line 14, change "number signal" to --NUMBER SIGNAL--.

Column 6, line 32, change "REPLAY" to --REPLY--.

Column 6, line 37, change "modiciations" to --modifications--.

Column 6, line 41, change "encyrption" to --encryption--.

Column 6, line 44, change "pseudorandum" to --pseudorandom--.

Column 6, line 46, change "pseudorandum" to --pseudorandom--.

Column 6, line 48, change "pseudorandum" to --pseudorandom--.

Signed and Sealed this

*Twenty-third* Day of *March 1982*

[SEAL]

*Attest:*

GERALD J. MOSSINGHOFF

*Attesting Officer* *Commissioner of Patents and Trademarks*